United States Patent [19]
Janiszewski

[11] 3,935,764
[45] Feb. 3, 1976

[54] GUIDING MEANS FOR BORING BAR

[76] Inventor: Kasimir Janiszewski, 11908 W. Loomis Road, Franklin, Wis. 53132

[22] Filed: Mar. 5, 1975

[21] Appl. No.: 555,461

[52] U.S. Cl. .......................... 82/1.2; 82/1.4; 408/82
[51] Int. Cl.² .......................................... B23B 41/06
[58] Field of Search ........... 82/1.2, 1.3, 1.4; 408/80, 408/81, 82, 200, 201, 202

[56] References Cited
UNITED STATES PATENTS

| | | | |
|---|---|---|---|
| 2,500,469 | 3/1950 | Rekettye | 408/82 |
| 3,795,160 | 3/1974 | Janiszewski | 82/1.4 |

FOREIGN PATENTS OR APPLICATIONS

| | | | |
|---|---|---|---|
| 568,844 | 4/1945 | United Kingdom | 82/1.4 |
| 520,335 | 3/1931 | Germany | 408/82 |

*Primary Examiner*—Harrison L. Hinson
*Attorney, Agent, or Firm*—Henry C. Fuller

[57] ABSTRACT

Guide means are provided to guide a boring bar to provide a concentric opening in a work piece. The boring bar is in the form of a hollow sleeve which is guided by a separable guide pin fixed to a work table and which telescopes into the sleeve as the boring bar moves into the work piece. In one embodiment, a guide element projects inwardly into the opening in the sleeve to engage the guide pin. In another embodiment a roller bearing has a portion of its periphery projecting through a slot in the boring bar into the interior of the sleeve to engage the telescoping guide pin. Use of the hollow boring bar and the telescopic guide pin minimizes the length which otherwise would be required for a boring bar with guide means.

4 Claims, 3 Drawing Figures

U.S. Patent  February 3, 1976  3,935,764
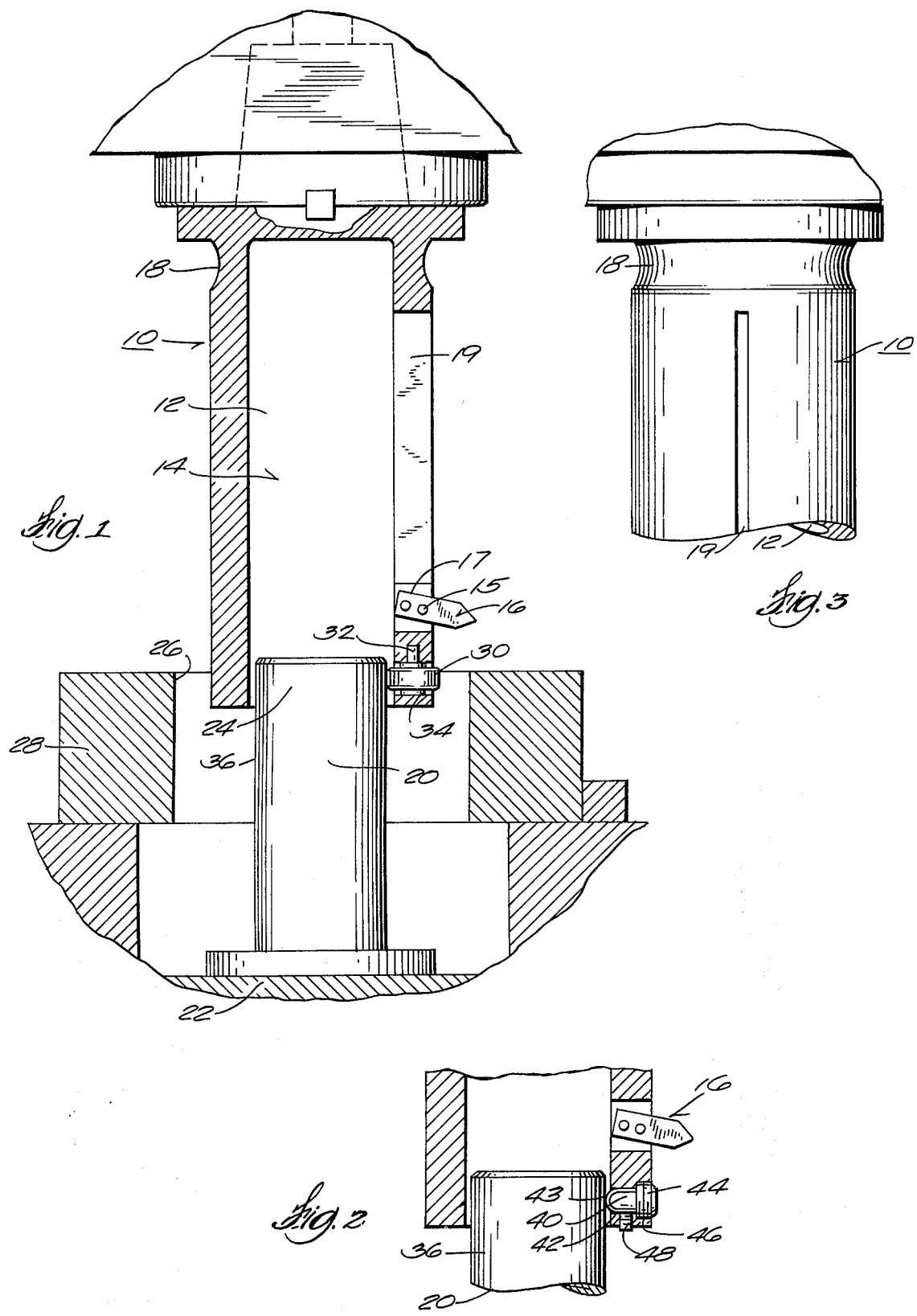

GUIDING MEANS FOR BORING BAR

BACKGROUND OF INVENTION

The present invention is a further development of the subject matter of my U.S. Pat. No. 3,795,160 and application Ser. No. 505,393 filed Sept. 12, 1974. The invention set forth in the foregoing patent and patent application utilize a separate guide sleeve which engages a guide element on the free end of the boring bar. The present invention omits the need for a costly sleeve and minimizes the length of the boring bar to thus reduce the cost of such tool.

SUMMARY OF INVENTION

The invention provides a hollow tubular boring bar which is guided by a telescopically received guide pin and a bearing or projection carried by the boring bar which engages the guide pin as it telescopes into the interior of the boring bar. The boring bar can thus be of a length less than that disclosed in my previous patent. Reducing the length of the boring bar also minimizes the whip associated with rotation of the bar. Furthermore, the cylindrical guide pin is considerably less expensive than a machined guide bushing as shown in my prior patent.

Further objects, advantages and features of the invention will become apparent from the following disclosure.

DESCRIPTION OF DRAWINGS

FIG. 1 is a vertical sectional view showing a boring bar and guide pin in accordance with the invention.

FIG. 2 is a fragmentary view similar to FIG. 1 showing a modified embodiment of the invention.

FIG. 3 is a fragmentary view of a boring bar with a longitudinal slot.

DETAILED DESCRIPTION OF THE PREFERRED EMBODIMENT

Although the disclosure hereof is detailed and exact to enable those skilled in the art to practice the invention, the physical embodiments herein disclosed merely execmplify the invention which may be embodied in other specific structure. The scope of the invention is defined in the claims appended hereto.

The boring bar 10 is provided with a hollow bore 12 which provides an integral sleeve portion 14. The boring bar is provided with a cutting tool 16 which projects generally radially from the boring bar and is secured by fasteners 15 in a cross bore 17. The boring bar can also be reduced in diameter at 18 to facilitate guided deflection by the guide means as subsequently described. A longitudinal slot 19 in the wall of the boring bar provides a weakened zone to further enable guided deflection of the boring bar 10.

In accordance with the invention, a separable guide pin 20 is supported on a work table 22 and has a free end 24 which projects into the drilled hole 26 of the work piece 28. The guide pin 20 is received in the bore 12 as the boring bar travels into the work piece 28. The boring bar is guided by a ball bearing 30 which is rotatably supported for rotation about an axis 32 parallel to and offset from the axis of the boring bar and within the wall 14. The bearing projects through a slot 34 into the bar 12 for engagement with the exterior surface 36 of the guide pin 20.

FIG. 2 shows a modified embodiment in which a pin 40 projects an aperture 42 in the boring bar with a round nose 43 which engages the surface 36 of the guide pin 20. The pin 40 can be provided with a threaded shank 44 which is threadably received in a counter bore 46. Lock screw 48 can be employed to secure the pin 40 in the desired position.

I claim:

1. In apparatus for boring holes including a rotatable and longitudinally movable boring bar having a free end and a generally radially projecting work tool for engaging and removing material from a bore in a work piece, the improvement comprising wall means defining an axial opening in said boring bar and a guide element separate from said boring bar and telescopically receivable in said opening, and guide means on said boring bar projecting inwardly into said axial opening and engageable with said guide element.

2. The improvement of claim 1 wherein said guide means comprises a pin mounted in the wall of said boring bar and projecting inwardly for engagement with said guide element.

3. The improvement of claim 1 including a slot in said wall means and wherein said guide means comprises a roller bearing having a portion of its periphery projecting inwardly into the axial opening in said boring bar through said slot and having an axis of rotation parallel to the axis of said boring bar.

4. The improvement of claim 1 wherein said boring bar has a longitudinal slot in the outer wall to facilitate guided deflection by said guide means and guide element.

* * * * *